Patented Oct. 13, 1925.

1,557,520

UNITED STATES PATENT OFFICE.

CARLETON ELLIS, OF MONTCLAIR, NEW JERSEY.

CLEANER.

No Drawing.   Application filed June 16, 1924.  Serial No. 720,457.

*To all whom it may concern:*

Be it known that I, CARLETON ELLIS, a citizen of the United States, and a resident of Montclair, in the county of Essex and State of New Jersey, have invented certain new and useful Improvements in Cleaners, of which the following is a specification.

This invention relates to a cleaner intended to remove grease and paint spots and the like from textiles or other materials or surfaces and relates especially to a composition of a non-inflammable or substantially non-inflammable character.

In its preferred form the basis of the composition in a non-inflammable solvent such as trichlorethylene admixed with another solvent of the nature of ethyl acetate, the proportion of the latter being such that the composition is practically non-inflammable. Trichlorethylene is of itself non-inflammable but does not have the power of suppressing the inflammability of volatile solvents such as ethyl acetate unless the latter is in minor proportion roughly for admixtures of one part or less of ethyl acetate to four parts of trichlorethylene. Trichlorethylene admixed with 15% of ethyl acetate makes a composition into which a lighted match may be thrown without ignition. A mixture containing 20 or 25% of ethyl acetate is not non-inflammable but the 20% composition is approximately on the border line between inflammability and non-inflammability as tested by means of a lighted match. With 25% of ethyl acetate such a mixture impregnated into the pores of leather, as for example gloves, will ignite when the tip of the glove is brought in contact with a lighted match. The combustion is not violent, however. With 15% of ethyl acetate the combustion under these circumstances is nil or at least so slow of propagation that the danger from using a cleaner of this character from the standpoint of inflammability is practically nil.

A composition for cleaning which is to be used by tailors and others in confined places must have an odor which is not objectionable and this is secured by using highly refined trichlorethylene and well refined ethyl acetate. Preferably the ethyl acetate is low in water content and commercial qualities containing some ethyl alcohol and showing its acid reaction due to acetic acid are not as desirable as those practically free from ethyl alcohol and acetic acid.

In the course of my experiments with trichlorethylene I have observed that on standing in a white glass bottle exposed to sunlight the trichlorethylene becomes acid and acquires an offensive odor. The same reaction occurs in admixture with ethyl acetate and for that reason the mixture should be protected from light. Even blue glass or brown glass bottles do not protect as advantageously as placing in ordinary tin cans which effectually shut out the light rays.

Carbon tetrachloride has been used as a cleaning fluid because it is non-inflammable but it has the disadvantage of not being a powerful solvent, having an odor which is considered quite unpleasant by many people and of sometimes attacking metal so that it usually has to be packaged in glass bottles which constitutes an expensive form of package.

Trichlorethylene is a somewhat better slvent than carbon tetrachloride and with the addition of ethyl acetate a strikingly effective solvent medium is obtained. For example the trichlorethylene alone will not readily soften and dissolve stains due to certain varnishes etc. but in conjunction with the ethyl acetate such stains may be readily removed. Moreover the odor of the ethyl acetate which is rather pleasantly sharp and ethereal blending with that of the trichlorethylene gives a more agreeable odor to the cleaning composition than is the case with carbon tetrachloride or for that matter trichlorethylene alone.

When a mixture of trichlorethylene with for example 15% of ethyl acetate is prepared cloudiness sometimes appears owing to presence of water. The mixtures may be thoroughly dried by drying agent such for example as anhydrous sodium sulphate and if acid may be neutralized by the addition of a little carbonate of soda. After agitation with these drying and neutralizing agents the liquid is filtered or decanted into tin cans. For example the cleaning liquid may thus be put in pint, quart or gallon varnish cans. A permanent package is thus obtained of a composite solvent serving as a more universal cleaner than carbon tetrachloride. Furthermore it does not have the inflammability and dangerous qualities of gasoline, alcohols, ethers and the like.

In some cases ant-acid material may be added such for example as aniline in small quantity, sodium acetate etc.

Trichlorethylene has been advocated as a solvent which would not turn acid and my observation that it reacts with ethyl acetate in the light to form an acid composition of pungent and offensive odor is, so far as I know, new in this art. I lay claim not only to the composition itself but the composition contained in a light-proof package or in a package permeable only to light rays which do not have this acid forming effect.

It is to be understood that while I have referred especially to ethyl acetate, other similar volatile esters are to be considered as being, to some extent, the equivalent. Of other volatile esters that can be used, I mention propyl acetate, ethyl and propyl formates, diethyl carbonate, as examples.

What I claim is:—

1. A composition for use as a cleaner, for cleaning fabrics, clothing and the like, consisting essentially of trichlorethylene and ethyl acetate, such mixture being substantially free from fats, soaps and waxes.

2. A cleaner for cleaning fabrics, clothing and the like comprising a dried mixture of trichlorethylene and ethyl acetate, such mixture being substantially free from fats and waxes.

3. A cleaner for cleaning fabrics, clothing and the like comprising a dried and neutralized mixture of trichlorethylene and ethyl acetate, such mixture being substantially free from fats and waxes.

4. A cleaner for cleaning fabrics, clothing and the like comprising a dried mixture of trichlorethylene and a volatile ester having a boiling point not substantially above that of ethyl acetate, such mixture being substantially free from fats and waxes.

5. A cleaner comprising a dried mixture of trichlorethylene and approximately 15% of ethyl acetate.

6. A cleaner comprising about four parts by volume of trichlorethylene and not exceeding one part by volume of ethyl acetate.

7. A cleaner for dry-cleaning fabrics, clothing and the like, comprising a mixture of dried trichlorethylene and a smaller amount of ethyl acetate, such mixture being substantially free from alcohols, acids, fats, and waxes, and from substantial and influential amounts of soap, and the vapors thereof mixed with air being not dangerously inflammable.

8. A cleaning composition, useful for cleaning fabric and the like, comprising a mixture of trichlorethylene and a volatile ester having a boiling point not substantially above that of ethyl acetate, such materials being so proportioned as to produce a composition which is not readily inflammable, such mixture being substantially free from fats and waxes.

9. A cleaning composition, useful for cleaning fabric and the like, comprising a dried mixture of trichlorethylene and a volatile ester having a boiling point not substantially above that of ethyl acetate, such materials being so proportioned to produce a composition which is not readily inflammable, such mixture being substantially free from fats and waxes.

10. A cleaning composition, useful for cleaning fabric and the like, comprising a dried and neutralized mixture of trichlorethylene and a volatile ester having a boiling point not substantially above that of ethyl acetate, such materials being so proportioned as to produce a composition which is not readily inflammable, such mixture being substantially free from fats and waxes.

11. A cleaner for cleaning fabrics, clothing and the like comprising a dried mixture containing essentially trichlorethylene and ethyl acetate in such proportions as to form a substantially noninflammable product, such mixture being substantially free from fats and waxes.

12. A cleaner for cleaning fabrics, clothing and the like comprising trichlorethylene and ethyl acetate in such proportions as to be substantially non-inflammable, and substantially acid-free and substantially free from fatty and waxy materials.

13. A cleaner for cleaning fabrics, clothing and the like comprising trichlorethylene, ethyl acetate and an antacid, in such proportions as to be non-inflammable, and substantially acid-free and substantially free from fatty and waxy materials.

14. A cleaner for cleaning fabrics, clothing and the like comprising a dry neutral mixture of trichlorethylene and ethyl acetate in such proportions as to produce a substantially non-inflammable composition.

CARLETON ELLIS.